United States Patent
Li et al.

(10) Patent No.: US 10,223,259 B1
(45) Date of Patent: Mar. 5, 2019

(54) MEMORY DEVICE WITH DYNAMIC STORAGE MODE CONTROL

(71) Applicant: Micron Technology, Inc., Boise, ID (US)

(72) Inventors: Yun Li, Fremont, CA (US); Kishore Kumar Muchherla, Fremont, CA (US); Peter Feeley, Boise, ID (US); Ashutosh Malshe, Fremont, CA (US); Daniel J. Hubbard, Boise, ID (US); Christopher S. Hale, Boise, ID (US); Kevin R. Brandt, Boise, ID (US); Sampath K. Ratnam, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 15/693,153

(22) Filed: Aug. 31, 2017

(51) Int. Cl.
   *G06F 12/00* (2006.01)
   *G06F 12/02* (2006.01)
   *G06F 12/0891* (2016.01)

(52) U.S. Cl.
   CPC ...... *G06F 12/0253* (2013.01); *G06F 12/0891* (2013.01); *G06F 2212/1044* (2013.01)

(58) Field of Classification Search
   None
   See application file for complete search history.

(56) References Cited

U.S. PATENT DOCUMENTS

| | | | | |
|---|---|---|---|---|
| 2012/0011301 | A1* | 1/2012 | Goss | G06F 12/0246 711/103 |
| 2014/0201423 | A1* | 7/2014 | Jean | G06F 12/0246 711/103 |
| 2016/0284393 | A1* | 9/2016 | Ramalingam | G11C 11/5628 |
| 2017/0371588 | A1* | 12/2017 | Shaharabany | G06F 3/068 |

* cited by examiner

*Primary Examiner* — Daniel D Tsui
(74) *Attorney, Agent, or Firm* — Perkins Coie LLP

(57) ABSTRACT

A memory system includes: a memory array including a plurality of memory cells, the plurality of memory cells including a plurality of cache memory cells; and a controller coupled to the memory array, the controller configured to: track usage of a first subset of the plurality of cache memory cells operating in a single-level cell (SLC) mode, wherein the tracking includes monitoring for an idle time event; and designate a storage mode for a second subset of the plurality of cache memory cells based on the tracked usage of the first subset, wherein the storage mode determines a storage density to be used for data writes.

21 Claims, 4 Drawing Sheets

MEMORY DEVICE WITH DYNAMIC STORAGE MODE CONTROL

TECHNICAL FIELD

The disclosed embodiments relate to memory devices, and, in particular, to memory devices with a mechanism for dynamic control of storage mode.

BACKGROUND

Memory systems can employ memory devices to store and access information. The memory devices can include volatile memory devices, non-volatile memory devices, or a combination device. The non-volatile memory devices can include flash memory employing "NAND" technology or logic gates, "NOR" technology or logic gates, or a combination thereof.

Memory devices, such as flash memory, utilize electrical charges, along with corresponding threshold levels or processing voltage levels, to store and access data. In storing the data, the memory devices may have some storage portions that provide faster operating speeds and other storage portions that provide higher storage capacity and/or density. While attempts have been made optimize memory devices to best exploit these different capabilities, various challenges (e.g., numerous different usage conditions, changes in performance characteristics of the flash memory devices caused by usage, etc.) have made it difficult to take full advantage of the different characteristics.

Thus, there is a need for a memory device with dynamic storage mode control. In view of the ever-increasing commercial competitive pressures, along with growing consumer expectations and the desire to differentiate products in the marketplace, it is increasingly desirable that answers to these problems be found. Additionally, the need to reduce costs, improve efficiencies and performance, and meet competitive pressures adds an even greater pressure to find these answers.

DETAILED DESCRIPTION

Figure 1:
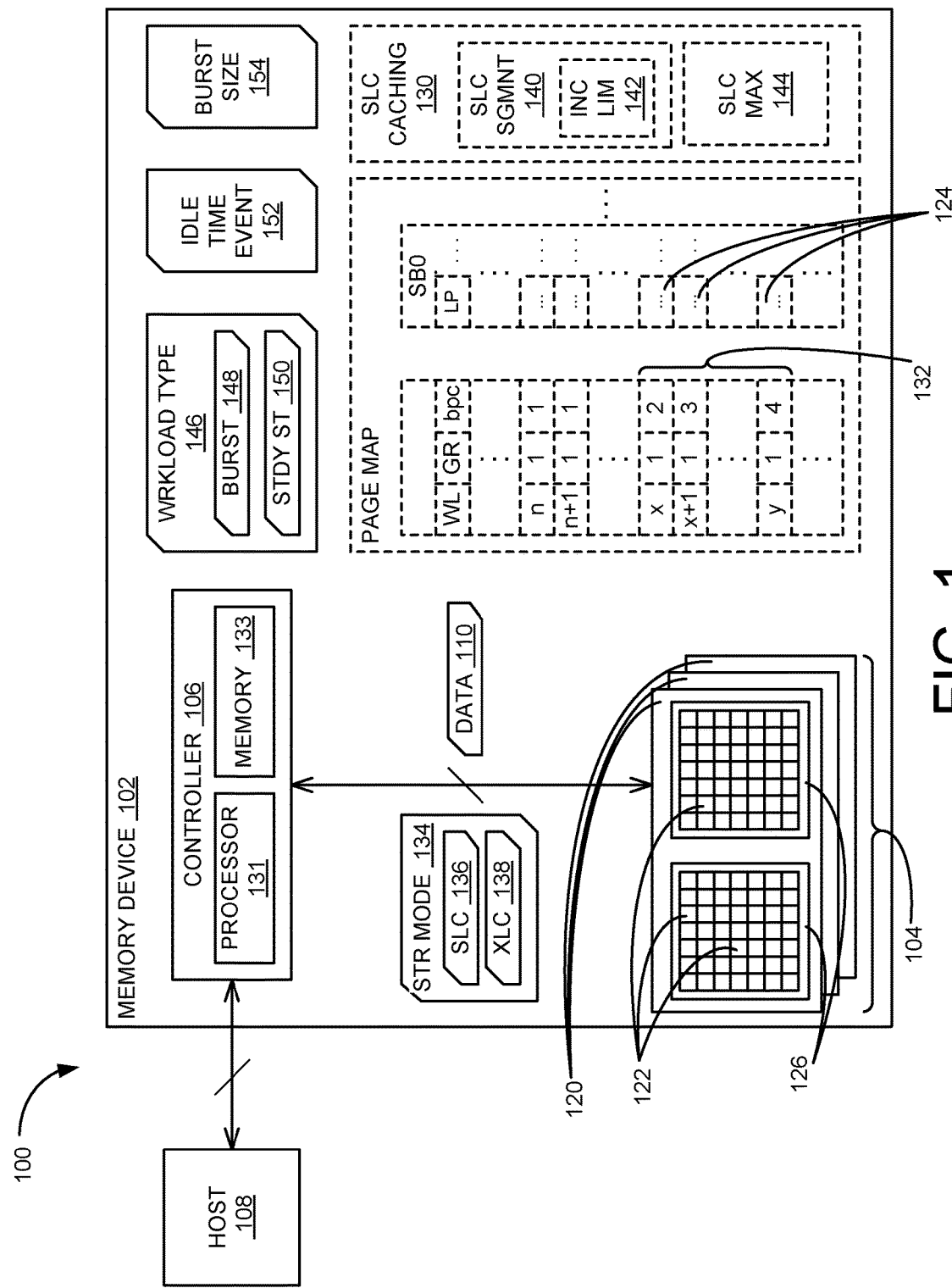
FIG. 1 is a block diagram of a memory system with dynamic storage mode control in accordance with an embodiment of the present technology.

The technology disclosed herein relates to memory devices, systems with memory devices, and related methods for dynamically controlling storage mode for the memory devices. The memory systems can use indicators to determine or recognize a type or a pattern of work being processed by the memory systems. According to the determined type or pattern, the memory systems can further control the mode of memory cells to adapt to the work being processed by the memory systems and provide processing improvements.

A memory device can include single-level cells (SLCs) for holding or representing one bit per cell (e.g., in one of two charge levels) and/or extra-level cell (XLCs) for holding or representing multiple bits pre cell (e.g., in one of more than two charge levels) according to a type or a characteristic of the work being processed by the memory device. An SLC can be programmed to a targeted one of two different data states that can be represented by the binary units 1 or 0. An XLC can be programmed to a targeted one of more than two data states.

For example, an XLC can include a flash memory cell that can be programmed to any one of four states (e.g., represented by the binary 00, 01, 10, 11) to store two bits of data. Such XLCs are known as a multilevel cells (MLCs). Still other XLCs can include flash memory cells the can be programmed to any one of eight data states (e.g., 000, 001, 010, 011, 100, 101, 110, 111) to store three bits of data in a single cell. Such cells may be referred to as triple level cells (TLC). Even higher number of data states are possible for XLCs. For example, quad level cells (QLCs) can be programmed to any one of 16 data states (e.g., 0000, 0001, 0010, 0011, 0100, 0101, 0110, 0111, 1000, 1001, 1010, 1011, 1100, 1101, 1110, 1111) for storing four bits of data.

The memory cells capable of storing higher numbers of data states can provide higher density memories or bulk memory without increasing the number of memory cells, since each cell can represent more than one digit (e.g., more than one bit). While more information can be stored in a given number of cells when operating as XLCs, write performance may reduce due to slower programming times required for XLCs. For example, write performance may degrade in employing additional or detailed processes to write data according to tolerance windows that decrease by increasing the number of possible data states within a given range. As such, SLCs may be used as cache memory for NAND flash memory devices. The SLC cache can include static SLC cache defined by SLC reserved blocks or dynamic SLC cache defined by using XLC blocks in SLC mode.

However, operating the XLC memory blocks in SLC mode can reduce the effective size of the memory blocks, which reduces the storage capacity. For example, for blocks capable of representing two bits, operating in the SLC mode would reduce the capacity by half. Also for example, operating TLC memory blocks in SLC mode would reduce the capacity to one-third original, and QLC blocks would be reduced to one-fourth, etc. Potential addresses that are lost due to the reduction in capacity, such as corresponding to the remaining unused half, two-thirds, or three-fourths in the examples above, may be forced into garbage collection for certain types of workloads. Workloads can include processes that a memory device has been tasked to perform at a given time. Workloads can be characterized by pauses or breaks within the processing (e.g., for user workload patterns) or by absence of any pause or breaks (e.g., for steady state sequential workloads).

As such, a memory device can leverage the pauses to determine or recognize the workload type and manage the dynamic caching accordingly. For example, the memory system can use idle time as an indication to determine the workload types. Also for example, the memory system can divide the available memory into increments to manage the operating modes according to usage of the increments. Also for example, the memory system can increase the amount of host data that can be written in SLC mode.

In determining the workload type and managing the dynamic cache, the embodiments described below can provide dynamic burst capabilities appropriate for the operation facilitated by the system. The memory device can dynamically control the operating mode according to the workload type, which improves the write performance and effective management of the performance penalty associated with garbage collection.

Further, the term "dynamic" as used herein includes processes, functions, actions or implementation occurring during the operation, usage or deployment of a memory device. Dynamically occurring processes, functions, actions or implementation can occur after the design, manufacture, and initial testing, setup or configuration (e.g., in a user environment).

FIG. 1 is a block diagram of a memory system 100 with dynamic storage mode control configured in accordance with an embodiment of the present technology. The memory system 100 includes a memory device 102 having a memory array 104 (e.g., NAND flash) and a controller 106. The memory device 102 can operably couple the memory array 104 to a host device 108 (e.g., an upstream central processor (CPU)).

The memory array 104 can include circuitry configured to store data and provide access to data. The memory array 104 can be provided as semiconductor, integrated circuits and/or external removable devices in computers or other electronic devices. The memory array 104 includes a plurality of memory regions, or memory units 120. The memory units 120 can be individual memory dies, memory planes in a single memory die, a stack of memory dies vertically connected with through-silicon vias (TSVs), or the like. In one embodiment, each of the memory units 120 can be formed from a semiconductor die and arranged with other memory unit dies in a single device package (not shown). In other embodiments, one or more of the memory units 120 can be co-located on a single die and/or distributed across multiple device packages. The memory device 102 and/or the individual memory units 120 can also include other circuit components (not shown), such as multiplexers, decoders, buffers, read/write drivers, address registers, data out/data in registers, etc., for accessing and/or programming (e.g., writing) the data and other functionality, such as for processing information and/or communicating with the controller 106.

Each of the memory units 120 includes an array of memory cells 122 that each store data in a charge storage structure. The memory cells 122 can include, for example, floating gate, charge trap, phase change, ferroelectric, magnetoresitive, and/or other suitable storage elements configured to store data persistently or semi-persistently. The memory cells 122 can be one-transistor memory cells that can be can be programmed to a target state to represent information. For instance, electric charge can be placed on, or removed from, the charge storage structure (e.g., the charge trap or the floating gate) of the memory cell 122 to program the cell to a particular data state.

The stored charge on the charge storage structure of the memory cell 122 can indicate a threshold voltage (Vt) of the cell. The threshold voltage can correspond to the different data states allowable for the corresponding memory cell 122. For example, SLCs can be programmed to a targeted one of two different data states, which can be represented by the binary units 1 or 0. Similarly, the threshold voltage can correspond to four data states for MLCs, eight data states for TLCs, 16 data states for QLCs, etc.

The memory cells 122 can be arranged in rows (e.g., each corresponding to a word line) and columns (e.g., each corresponding to a bit line). Each word line can include one or more memory pages 124, depending upon the number of data states the memory cells 122 of that word line are configured to store.

For example, the memory cells 122 of a single word line (i.e., including a single memory page 124) can each store one of two data states (e.g., SLC memory cells configured to store one bit each). Alternatively, the memory cells 122 of a single word line (i.e., including two memory pages 124) can each store one of four data states (e.g., MLC memory cells configured to store two bits each) can include two memory pages 124. Moreover, within the word line, pages 124 can be interleaved so that the memory cells 122 of the word line configured to store one of two data states (e.g., SLC memory cells) can include two pages, in an "even-odd bit line architecture" (e.g., where all the memory cells 122 in odd-numbered columns of a single word line are grouped as a first page, and all the memory cells 122 in even-numbered columns of the same word are grouped as a second page). When even-odd bit line architecture is utilized in organizing word lines having the memory cells 122 that are each configured to store larger numbers of data states (e.g., memory cells configured as MLC, TLC, QLC, etc.), the number of pages per word line can be even higher (e.g., 4, 6, 8, etc.).

Each column can include a string of series-coupled memory cells 122 coupled to a common source. The memory cells 122 of each string can be connected in series between a source select transistor (e.g., a field-effect transistor) and a drain select transistor (e.g., a field-effect transistor). Source select transistors can be commonly coupled to a source select line, and drain select transistors can be commonly coupled to a drain select line.

The memory device 102 can process data using different groupings of the memory cells 122. For example, the memory pages 124 of the memory cells 122 can be grouped into memory blocks 126. In operation, the data can be written or otherwise programmed (e.g., erased) with regards to the various memory regions of the memory device 102, such as by writing to groups of pages 124 and/or memory blocks 126. In NAND-based memory, a write operation often includes programming the memory cells 122 in selected memory pages 124 with specific data values (e.g., a string of data bits having a value of either logic 0 or logic 1). An erase operation is similar to a write operation, except that the erase operation re-programs an entire memory block 126 or multiple memory blocks 126 to the same data state (e.g., logic 0).

In other embodiments, the memory cells 122 can be arranged in different types of groups and/or hierarchies than those shown in the illustrated embodiments. Further, while shown in the illustrated embodiments with a certain number of memory cells, rows, columns, blocks, and memory units for purposes of illustration, in other embodiments, the number of memory cells, rows, columns, blocks, and memory units can vary, and can be larger or smaller in scale than shown in the illustrated examples.

For example, in some embodiments, the memory device 100 can include only one memory unit 120. Alternatively, the memory device 100 can include two, three, four, eight, ten, or more (e.g., 16, 32, 64, or more) memory units 120. While the memory units 120 are shown in FIG. 1 as including two memory blocks 126 each, in other embodiments, each memory unit 120 can include one, three, four eight, or more (e.g., 16, 32, 64, 100, 128, 256 or more memory blocks). In some embodiments, each memory block 126 can include, e.g., $2^{15}$ memory pages, and each memory page within a block can include, e.g., $2^{12}$ memory cells 122 (e.g., a "4k" page).

The controller 106 can be a microcontroller, special purpose logic circuitry (e.g., a field programmable gate array (FPGA), an application specific integrated circuit (ASIC), etc.), or other suitable processor. The controller 106 can include a processor 131 configured to execute instructions stored in memory. In the illustrated example, the memory of the controller 106 includes an embedded memory 133 configured to perform various processes, logic flows, and routines for controlling operation of the memory system 100, including managing the memory device 102 and handling communications between the memory device 102 and the host device 108. In some embodiments, the embedded memory 133 can include memory registers storing, e.g., memory pointers, fetched data, etc. The embedded memory 133 can also include read-only memory (ROM) for storing micro-code. While the exemplary memory device 102 illustrated in FIG. 1 has been illustrated as including the controller 106, in another embodiment of the present technology, a memory device may not include a controller, and may instead rely upon external control (e.g., provided by an external host, or by a processor or controller separate from the memory device).

The memory system 100 can implement dynamic SLC caching operation 130 for operating on data 110 with the memory array 104 (e.g., reading, writing, erasing, etc.). For the dynamic SLC caching operation 130, the memory system 100 can temporarily store data (e.g., most active data) on XLC units 132 configured in SLC mode to improve access or read times, write times, or a combination thereof. The XLC units 132 are memory cells capable of storing more than one bit of data. For example, the XLC units 132 can include MLCs, TLCs, QLCs, or any other memory cells capable of holding more than one bit per cell.

In FIG. 1, the XLC units 132 are illustrated using a page map. The page map can represent groupings of the memory cells 122, addresses, types, or a combination thereof for the memory pages 124 for each of the memory blocks 126. The page map can identify logical page types, such as lower, upper, or extra page, and also world-line and word-line group associated with each of the pages. The page map can further include bits-per-cell (illustrated as 'bpc') corresponding to the bit-holding capacity of each cell (e.g., SLCs corresponds to bpc value of one and XLCs correspond to bpc values greater than one).

The memory system 100 can determine a storage mode 134 for controlling the storage capacity and processing time of the XLC units 132. The storage mode 134 can be represented by a signal or parameter indicating a storage capacity of the corresponding XLC units 132. The storage mode 134 can indicate that the XLC units 132 are used to store either a number of bits less than their corresponding full capacity, or a number of bits corresponding to their full capacity.

For example, the memory system 100 can designate the storage mode 134 as SLC mode 136 or XLC mode 138. The SLC mode 136 can include the signal or parameter used to indicate that the corresponding XLC units 132 are used to store one bit per cell. In other words, the memory system 100 can use the SLC mode 136 to have the XLC units 132 operate as though they were SLC units. In contrast, the memory system 100 can use the XLC mode 138 to have the XLC units 132 operate at their full capacity (e.g. storing two bits per cell for MLC units, three bits per cell for TLC units, four bits per cell for QLC units, etc.).

For illustrative purposes, the XLC mode 138 is described below as indicating that the corresponding memory cells 122 are used to store a number of bits per cell corresponding to their full capacity. However, it is understood that the memory system 100 can utilize different subsets of control signals or parameters to designate storage modes in which multiple bits per cell are used, but at less than the full capacity of the corresponding memory cells 122 (e.g., using TLC cells in MLC mode, etc.).

Using the SLC mode 136, the memory system 100 can improve the write performance while reducing the storage density of the XLC units 132. Alternatively, using the XLC mode 138 can reduce the write performance while increasing the storage density of the XLC units. When the memory blocks 126 are operated in the XLC mode 138, the full range of logical block addresses (LBA) can be accommodated on the memory array 104. In contrast, utilizing MLC, TLC or QLC blocks in the SLC mode 136 can reduce the accessible LBA range for those blocks by factor of 2, 3 or 4, respectively.

While the full LBA range may be available in XLC mode, writing with the full storage capacity (e.g., at the maximum number of supported bits per cell) can be slower than writing one bit per cell for various reasons. For example, operating the XLC units 132 in the SLC mode 136 can allow larger margins for read thresholds and fewer iterations for incremental step pulse programming (ISPP) used to write the target data. To write data according to ISPP, the memory device 102 can store charge on the charge storage structure of a memory cell via incremental programming. To program the memory cell to a desired target state, a series of incremental charges can be applied at multiple times to increase the charge stored on the cell's charge storage structure. After each programming step, the charge stored on the charge storage structure can be verified to determine whether it has reached the desired target state. By operating in the SLC mode, the memory system 100 can use larger amounts of charge for each increment such that less iterations are needed to reach the desired level.

For certain types of operations handled by the memory device 102, improving the write speed can lead to an overall performance gain without experiencing any significant negative impact from the reduction in the storage density. The memory system 100 can use the storage mode 134 along with SLC segment 140 to balance the write performance and the size of the accessible LBA range according to the type of operations handled by the memory device 102. The SLC segment 140 is a subset of the memory cells 122 within the full grouping of cells allotted for the SLC caching operation 130. The memory system 100 can determine the subset based on a quantity or a size (e.g., 10 GB) of the memory cells 122 (e.g., for specifying the quantity or size of pages 124 or blocks 126) represented by a SLC increment size 142.

The SLC increment size 142 can be fixed or predetermined. The memory system 100 can also dynamically calculate the SLC increment size 142 during operation of the memory device 102. The SLC increment size 142 can be less than a SLC maximum threshold 144. The SLC maximum threshold 144 can represent a limit (e.g., storage capacity or size) for storing the data 110 in the SLC mode 136. For illustrative example, the total dynamic SLC cache size, or the SLC maximum threshold 144 can be around 85 GB for a 256 GB TLC density. The corresponding SLC increment size 142 can be 10 GB or any other size less than 85 GB.

The memory system 100 can dynamically designate the SLC mode 136 according to a workload type 146. The workload type 146 characterizes a sequence of operations that the memory device 102 has been tasked to perform at a given time. The memory system 100 can determine the workload type 146 based on the operations being executed with regards to the data 110. For example, the memory system 100 can determine the workload type 146 as a burst workload 148 or a steady state 150.

The burst workload 148 corresponds to an operating mode that includes designed or inherent pauses or interruptions in the data operations. For example, the burst workload 148 can include a user workload, such as loading a new program or executing a set of processes requiring user input.

The steady state 150 corresponds to an operating mode in which larger amounts of data are read or written without any pauses or interruption. The steady state 150 can correspond to data operations in which no pause or interruption occurs in the processing of an amount of data exceeding an arbitrary threshold. For example, the steady state 150 can include streaming content, large file transfers, loading or storing disk images (i.e., a computer file containing contents and structure of the data stored in a data storage device, such as the memory device 102), etc.

The memory system 100 can determine the workload type 146 based on the detection of an idle time event 152. An idle time event is a pause or interruption in the operations (e.g., read or write) performed by the memory system 100 in connection with the data 110. Accordingly, the memory system 100 can determine the workload type 146 to be the burst workload 148 based on identification or detection of the idle time event 152. The memory system 100 can determine the workload type 146 to be the steady state 150 in the absence of the idle time event 152. For example, the memory system 100 can use a time or an instruction threshold in comparison to the identification or the detection of the idle time event 152.

The memory system 100 can use the idle time event 152, the workload type 146, or a combination thereof to manage the SLC caching operation 130. The memory system can control or designate the storage mode 134, manage or clean up the stored data, adjust or allot resources for upcoming or anticipated data and processes, or a combination thereof based on the idle time event 152, the workload type 146, or a combination thereof. The memory system 100 can use the pause or the interruption to move the data in or out of the cache memory, such as from SLC to XLC.

In some embodiments, the memory system 100 can also calculate a burst size 154 which can be used to dynamically calculate the SLC increment size 142. The burst size 154 is a representation of an amount of data processed for each grouping or segment of operations or instructions between the idle time events 152. The burst size 154 can include an estimate of the upcoming or anticipated data or processes. The burst size 154 can correspond to the operations on the data 110 associated with the burst workload 148.

The burst size 154 can be calculated based on a variety of ways. For example, the memory system 100 can calculate the burst size 154 as the amount of valid data stored or accessed during the previous interval between the idle time events 152. Also for example, the memory system 100 can calculate the burst size 154 as a running average of the valid data stored or accessed during successive intervals between the idle time events 152. Also for example, the memory system 100 can calculate the burst size 154 based on recognizing a pattern or a trend in the previously occurring amounts of the valid data stored or accessed during preceding intervals.

Figure 2:
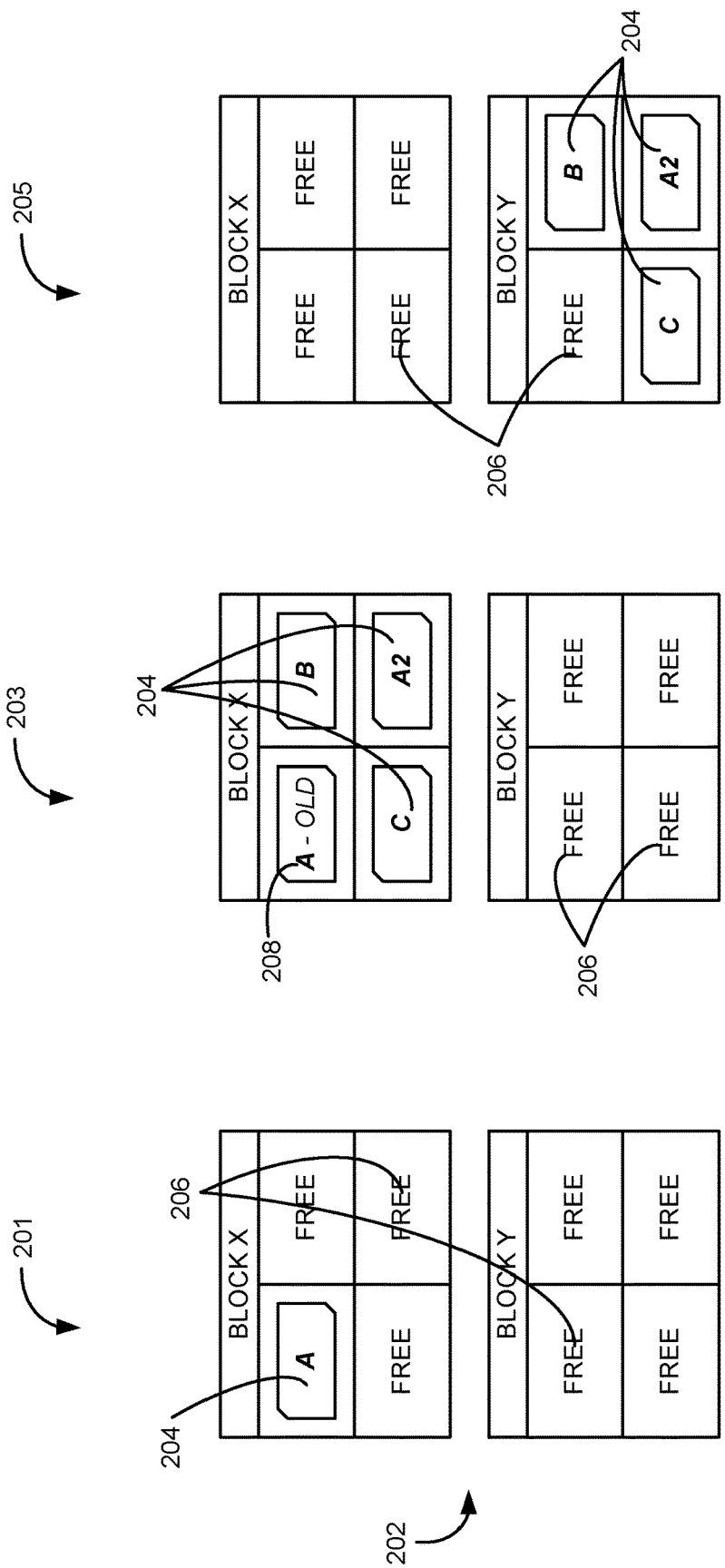
FIGS. 2A, 2B and 2C illustrate a garbage collection function in accordance with an embodiment of the present technology.

FIGS. 2A, 2B and 2C illustrate a progression for a garbage collection function 202 in accordance with an embodiment of the present technology. The garbage collection function 202 finds old or stale data for erasure in reclaiming the memory block 126 of FIG. 1 for reuse in storing new data. Through the garbage collection function 202, valid data 204 from one or more pages can be collected and written to a new empty page and the old page can be invalidated, erased, and reclaimed for reuse and subsequent storage of new incoming data. The valid data 204 is a correct or up-to-date instance of the data 110 of FIG. 1 stored in the memory cells 122 of FIG. 1. When previous data is updated, flash memory devices write the new data (i.e., the valid data 204) to a different location, with the old data becoming stale or unnecessary, instead of directly overwriting the old data with the new data. The garbage collection function 202 can remove such stale or unnecessary data while retaining the valid data 204 at a new location. Since flash memory devices write in increments of the memory pages 124 of FIG. 1 and erase in increments of the memory blocks 126, the garbage collection function 202 can move pages of data and free up memory blocks for erase operations.

FIGS. 2A, 2B and 2C conceptually illustrate a sequence of states associated with the data 110 stored in the memory array 104 of FIG. 1 (such as in the memory pages 124 within the memory blocks 126 labeled 'Block X' and 'Block Y') at times 201, 203, and 205 during the garbage collection function 202. FIG. 2A illustrates an initial state or a starting point of the state of the data 110 stored in 'Block X' at time 201. FIG. 2B illustrates a changed state or an update to the state of the data 110 stored in 'Block X' at later time 203. FIG. 2C illustrates the garbage collection function 202 moving valid data 204 from 'Block X' to 'Block Y' at time 205.

For example, in FIG. 2A, 'Block X' can store or include the valid data 204 labeled 'A.' Other available instances of the memory pages 124 can each be associated with a write-available status 206 representing that the corresponding page is unoccupied and available for writes.

In FIG. 2B, the memory system 100 can store further data, labeled 'B' and 'C.' The memory system 100 can further store data 'A2' representing updated version of data 'A,' which results in 'A' becoming old and stale. The valid data 204 at time 203 can correspond to data labeled 'B', 'C', and 'A2.' The previously stored and the still existing data 'A' can represent expired data 208. The expired data 208 can include the data 110 previously stored but no longer useful, out-of-date, stale, or invalid due to one or more subsequent processes, changes, or updates.

In FIG. 2C, the memory system 100 can implement the garbage collection function 202 to free up the memory cells 122. The memory system 100 can use the garbage collection function 202 to identify the valid data 204 and the expired data 208. As illustrated in FIG. 2C, the memory system 100 can copy the valid data 204, without the expired data 208, to a new location labeled 'Block Y'. The memory system 100 can then erase the data 110 (i.e., the duplicated valid data 204 and the expired data 208) stored in the targeted or processed block of 'Block X.' As a result, the memory pages 124 of 'Block X' can correspond to write-available status 206 representing availability for storing new incoming data.

Figure 3:
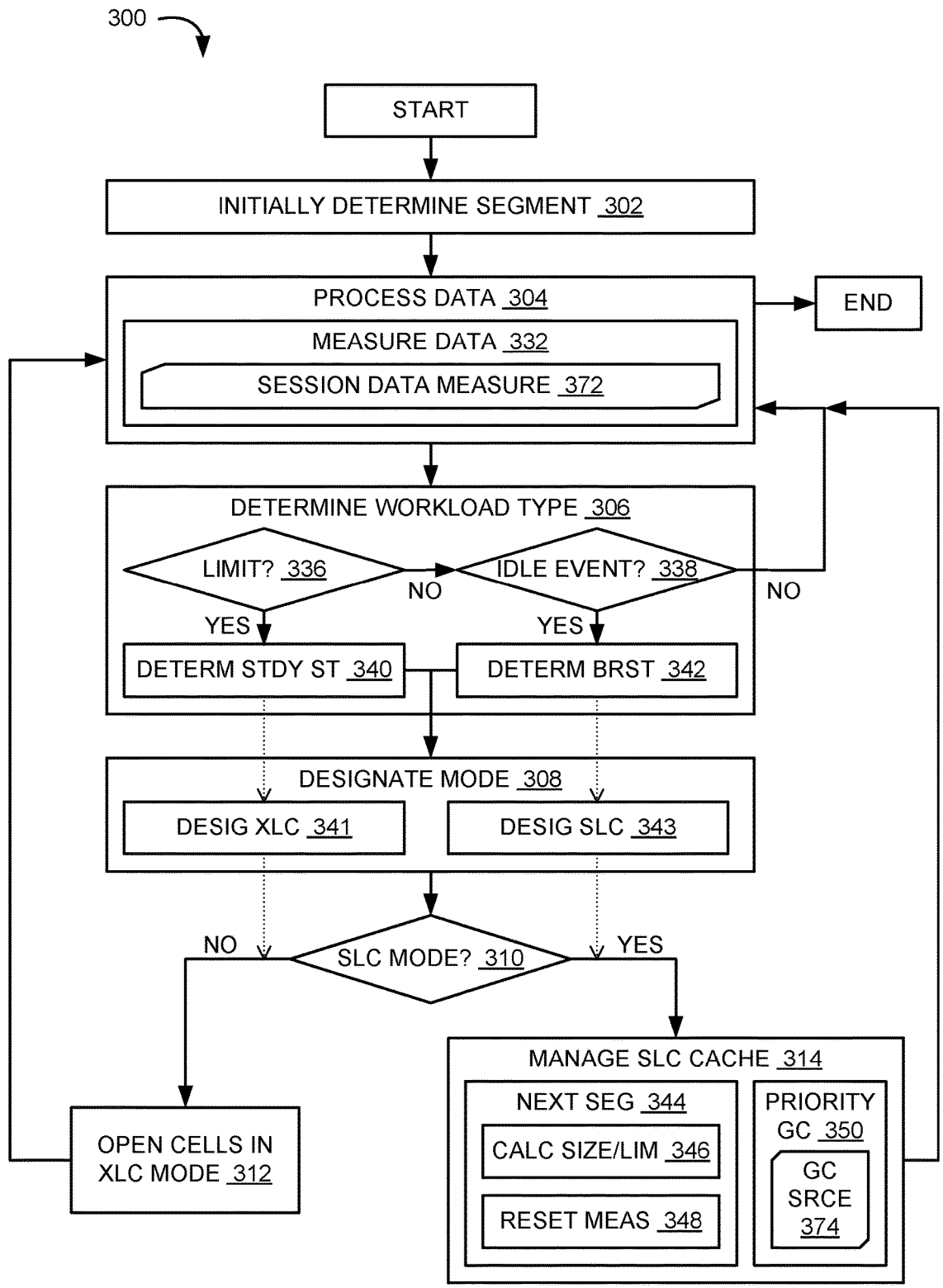
FIG. 3 illustrates an example method of operating the memory system in FIG. 1 in accordance with embodiments of the present technology.

FIG. 3 is a flow diagram illustrating an example method 300 of operating the memory system 100 of FIG. 1 in accordance with embodiments of the present technology. The method 300 can implement the dynamic SLC caching operation 130 of FIG. 1 according to the workload type 146 of FIG. 1 based on designating the SLC segment 140 within the full set of memory cells allowable for the dynamic SLC caching operation 130. The memory system 100 can designate the SLC segment 140 according to the SLC increment size 142 of FIG. 1 that is less than the SLC maximum threshold 144 of FIG. 1.

In implementing the dynamic SLC caching operation 130, the memory system 100 can determine the workload type 146 and designate the storage mode 134 of FIG. 1 accordingly. The memory system 100 can determine the workload type 146 and designate the storage mode 134 using the SLC segment 140 and the idle time event 152 of FIG. 1. For example, the memory system 100 can write to the SLC segment 140. The memory system 100 can compare the amount of data written to the SLC segment 140 before the idle time event 152 to determine whether the workload type 146 is the burst workload 148 of FIG. 1 or the continuous workload 150 of FIG. 1.

For processing the burst workload 148, the memory system 100 can use a variety of ways to further improve the write performance. In some embodiments, the memory system 100 can track the data 110 of FIG. 1 written in the SLC mode 136 of FIG. 1 after the idle time event 152 and reset the tracked amount at subsequent idle time in one or more embodiments. In some embodiments, the memory system 100 can prioritize the memory blocks 126 of FIG. 1 operating in the SLC mode 136 first for the garbage collection function 202 of FIG. 2 (e.g., before memory blocks 126 not operating in SLC mode 136). In some embodiments, the memory system 100 can adjust the SLC increment size 142, the SLC maximum threshold 144, or a combination thereof, to improve the performance of memory system 100 when processing the burst workload 148.

At a box 302, the memory system 100 can initially determine the SLC segment 140 for the SLC caching operation 130 by determining and/or storing addresses corresponding to the SLC segment 140. The memory system 100 can designate or group a portion or a subset of the memory cells 122 within the entirety of the memory cells 122 allotted for the SLC caching operation 130. The memory system 100 can initially designate or group a number of the memory cells 122, the memory pages 124, the memory blocks 126, or a combination thereof corresponding to an initial or predetermined value of the SLC increment size 142. The memory system 100 can use any value for the SLC increment size 142 less than the SLC maximum threshold 144, such that the SLC segment 140 is less than a full set of resources allowed for the SLC caching operation 130.

The memory system 100 can determine the memory cells 122 in the SLC segment 140 to operate in the SLC mode 136. The memory system 100 can determine the SLC segment 140 to include the XLC units 132 of FIG. 1 designated to operate in the SLC mode 136 for the SLC caching 130. The memory system 100 can store one bit in each of the memory cells 122 in the SLC segment 140 to operate in the SLC mode 136 regardless of their maximum storage capacity.

At a box 304, the memory system 100 can perform operations on the data 110. The memory system 100 can write or access the data 110 to or from the memory cells 122. The memory system 100 can use the SLC segment 140 for caching data, where the data 110 is initially written to the SLC segment 140 and subsequently moved to a another location, such as other XLC locations outside of cache locations. The memory system 100 can store in the SLC segment 140 the data 110 that is "hot" or frequently accessed, likely to be read within a threshold amount of time, or that is to be accessed according to a sequence.

During operation, the memory system 100 can track various records or details associated with the operations performed on the data. At a box 332, the memory system 100 can calculate a session data measure 372 representing an amount of the data 110 read from and/or written to the memory cells 122. The session data measure 372 can specify an amount of data stored and/or accessed in connection with the SLC caching operation 130 and further specify an amount of data stored and/or accessed in the SLC mode 136, such as the data in the SLC segment 140.

The memory system 100 can calculate the session data measure 372 in a variety of ways. For example, the memory system 100 can calculate the session data measure 372 based on the remaining LBA. Also for example, the memory system 100 can calculate the session data measure 372 by counting or tracking the amount of the data 110 stored in the SLC mode 136 or stored in the SLC segment 140 as the data is written. Also for example, the memory system 100 can calculate the session data measure 372 by counting or tracking the valid data 204 of FIG. 2, the write-available status 206 of FIG. 2, the expired data 208 of FIG. 2, or a combination thereof.

At a box 306, the memory system 100 can determine the workload type 146 for the operation being implemented by the memory device 102. The memory system 100 can determine the workload type 146 in a variety of ways, such as based on the idle time event 152, the session data measure 372, the SLC segment 140, or a combination thereof. In some embodiments, the memory system 100 can determine the workload type 146 based on the operation reaching a limit as represented in a box 336.

For example, the memory system 100 can determine the workload type 146 as the steady state 150, as represented by box 340, based on the SLC segment 140 or the memory allotted for SLC cache becoming full before the idle time event 152. The memory system 100 can also determine the steady state 150 when the session data measure 372 exceeds the SLC increment size 142, the SLC maximum threshold 144, or a combination thereof before occurrence of the idle time event 152.

Also for example, the memory system 100 can determine the workload type 146 based on identifying the idle time event 152 as represented by box 338. The memory system 100 can identify the idle time event 152 based on identifying a period of non-operation in processing the data 110, such as for a pause or a break. The memory system 100 can use the idle time event 152 to determine a type or category of the data processing that occurs in bursts of activity with the idle time event 152 occurring in between the bursts. Based on identifying the idle time event 152, the memory system 100 can determine the workload type 146 to be the burst workload 148, as represented by box 342. Further, the memory system 100 can stop tracking or calculating the session data measure 372 based on identifying the idle time event 152. With the reset, the memory system 100 can effectively calculate the session data measure 372 for representing the data 110 associated with or with respect to the idle time event 152.

Based on operations represented in boxes 336 and 338, the memory system 100 can determine the burst workload 148 based on the session data measure 372 or the SLC segment 140 in association with the idle time event 152. For example, the memory system 100 can determine the burst workload 148 when the idle time event 152 is identified before the SLC segment 140 becomes full or before the session data measure 372 exceeds the SLC increment size 142.

As represented by the loop from box 338 to box 304, the memory system 100 can continue to process the data when the operations represented by the boxes 336 and 338 determine that the limit has not been reached and no idle time has been identified. As the data 110 is being processed, the memory system 100 can continuously check the session data measure 372 against the limit or check the write-available status 206 of the SLC segment 140. The memory system 100 can also continuously check for the idle time event 152.

The memory system 100 can end the method 300 when the idle time event 152 is maintained longer than a threshold time. The memory system 100 can further end the method 300 based on a power-off or a reset event for the memory device 102.

At a box 308, the memory system 100 can designate the storage mode 134 for subsequent or upcoming data processing, such as reads, writes, erase, etc. The memory system 100 can dynamically designate the storage mode 134 for controlling a number of bits stored per each of the memory cells 122 for subsequent or upcoming data operations according to the workload type 146. The memory system 100 can designate the storage mode 134 according to the data operations reaching or exceeding a limit as checked in box 336 or according to identification of the idle time event 152 as checked in box 338.

At a box 341, the memory system 100 can designate the storage mode 134 as the XLC mode 138 for the XLC units 132 intended for subsequent data operations. The memory system 100 can designate the use of the full capacity of the memory cells 122 for subsequent data operations with the XLC mode 138. Using the SLC segment 140 and the absence of the idle time event 152, the memory system 100 can identify the steady state 150 and designate the XLC mode 138 accordingly.

At a box 343, the memory system 100 can designate the storage mode 134 as the SLC mode 136 for the memory cells 122 intended for subsequent data operations. The memory system 100 can designate the XLC units 132 to operate in the SLC mode 136, thereby controlling the corresponding memory cells 122 to each store one bit in subsequent operations. The memory system 100 can designate the SLC mode 136 to increase the write speed for the burst workload 148 characterized by occurrence of the idle time event 152 prior to full usage of the SLC segment 140.

As an illustrative example, the memory system 100 can track an amount of data (i.e., the session data measure 372) stored into a first subset of the memory cells 122 (i.e., XLC units) operating as cache memory cells. The memory system 100 can designate a second subset of the cache memory cells to operate in the SLC mode 136 if the idle time event 152 is detected before the first subset is fully written. The memory system 100 can also designate the second subset of the cache memory cells to operate in the XLC mode 138 if the first subset is fully written before detecting the idle time event 152.

The memory system 100 can manage the memory cells 122 differently based on the workload type 146, the storage mode 134, or a combination thereof. The memory system 100 can open or designate subsequent or next available instances of the memory blocks 126 to operate according to the storage mode 134. At a box 310, the memory system 100 can initiate different processes based on the storage mode 134.

At a box 312, the memory system 100 can open or designate subsequent blocks to operate in the XLC mode 138. The memory system 100 can open or designate the memory blocks 126 to operate in the XLC mode 138 in processing subsequent portions of the steady state 150. The memory system 100 can designate the memory blocks 126 to operate at full capacity in supporting the steady state 150. As such, the memory system 100 provides the benefit of limiting the use of the SLC mode to the SLC segment 140 instead of the full set of memory cells 122, and thereby increases the storage efficiency for the steady state 150.

At a box 314, the memory system 100 can manage the SLC cache for the burst workload 148. The memory system 100 can manage the SLC cache based on opening or designating segments, managing the garbage collection function 202, dynamically calculating or adjusting limits, or a combination thereof.

At a box 344, the memory system 100 can open or designate the subsequent blocks to operate in the SLC mode 136 in processing subsequent portions of the burst workload 148. The memory system 100 can dynamically determine the new or next instance of the SLC segment 140 including a subset of the memory cells 122, the memory pages 124, the memory blocks 126, or a combination thereof. The memory system 100 can designate the subset of memory including the XLC units 132 to operate in the SLC mode 136 and store one bit per each of the memory cells 122, regardless of the storage capacity of the corresponding cells.

In designating the subsequent SLC segment, the memory system 100 can use the SLC increment size 142 predetermined before the idle time event 152 in some embodiments. In other embodiments, as represented by box 346, the memory system 100 can dynamically calculate the SLC increment size 142 and vary the size of the SLC segments 140. The memory system 100 can calculate the SLC increment size 142 for the next SLC segment based on the burst size 154 of FIG. 1 that is calculated based on the session data measure 372.

For example, the memory system 100 can calculate the burst size 154 as the session data measure 372 tracked up to the identified idle time event 152. The memory system 100 can further calculate the burst size 154 as an average of the session data measures 372 across multiple idle time events 152. The memory system 100 can further calculate the burst size 154 as an estimation or a prediction based on a pattern for the data processing or the session data measure 372, or a combination thereof.

In addition to designating the next SLC segment, the memory system 100 can further adjust the SLC caching operation 130 for the burst workload 148. In some embodiments, the memory system 100 can designate the storage mode 134 according to the data 110 written in the SLC mode 136 for SLC caching operation 130. The memory system 100 can reset the session data measure 372, as represented by box 348, based on identifying the idle time event 152. Based on the reset, the memory system 100 can calculate the session data measure 372 for tracking the data 110 written in the SLC mode 136 after the idle time event 152. The memory system 100 can consider the amount of data written in the SLC mode 136, without data written in other modes, in considering and further determining the workload type 146, as illustrated in box 306. As an example, the memory system 100 can consider only the data 110 written in the SLC mode 136 after the idle time event 152 in comparing against the SLC increment size 142, the SLC maximum threshold 144, or a combination thereof.

Due to multiple idle times often occurring in the burst workload 148, the memory device 102 can effectively assume that no data has been written in SLC mode after each idle time event and continue to operate in SLC mode as long as there are free blocks. The continued or prolonged operation in the SLC mode can provide the write performance, whereas the stored blocks can be freed during the multiple idle time events 152 to offset the LBA lost range lost from operating in the SLC mode.

In some embodiments, the memory system 100 can optimize the SLC caching operation 130 by managing and prioritizing the garbage collection function 202 as represented by box 350. The memory system 100 can manage or prioritize based on setting a garbage collection source 374, representing the memory block 126 targeted for the garbage collection function 202, as the block operating in the SLC mode 136. As such, the memory system 100 can prioritize garbage collection for the memory cells 122 operating in the SLC mode 136, such as for the SLC segment 140 and the XLC units 132 operating in the SLC mode 136 therein, over other memory cells.

The memory system 100 can implement the garbage collection function 202 during the idle time event 152. Using the garbage collection function 202, the memory system 100 can move the valid data 204 in the targeted memory block 126 into less costly and more permanent storage locations during the idle time event 152. The memory system 100 can erase the targeted block and effectively free or avail the SLC cache memory or the SLC segment 140, or a portion thereof. As such, the memory system 100 can free up the previously used memory blocks for reuse in processing subsequent or upcoming data processing.

Conventionally, the garbage collection source 374 is determined based on the amount of the valid data 204 stored in the block, where the blocks with the lowest amount of valid data 204 are chosen first. In contrast, in at least some of the embodiments, the memory system 100 can set the garbage collection source 374 to the memory blocks 126 operating in the SLC mode 136 regardless of the amount of the valid data 204 stored therein. As such, the memory system 100 can garbage collect the SLC blocks first during idle time even if they have more valid data when compared to the XLC blocks. The criterion for setting the garbage collection source 374 can be for duration of the idle time event 152. For burst workloads 148, garbage collecting the SLC blocks first provides increased burst size for the SLC caching function 130.

In some embodiments, the memory system 100 can increase or vary the SLC threshold after each instance of the idle time event 152. The memory system 100 can increase or vary based on dynamically calculating the SLC increment size 142, the SLC maximum threshold 144, or a combination thereof. During or after the idle time event 152, the memory system 100 can dynamically calculate the SLC increment size 142, the SLC maximum threshold 144, or a combination thereof to control a size or capacity of the SLC segment 140 for subsequent or upcoming data writes.

As an example, the memory system 100 can update the SLC limits or thresholds by determining the total amount of the data 110 stored in the SLC mode 136 and offsetting the total by the predetermined or dynamically calculated result. The memory system 100 can effectively allot additional SLC burst data for each idle event when there are sufficient number of free blocks.

The memory system 100 can continue to process the data after designating the memory. As illustrated in FIG. 3, the control flow can loop back to box 304. For the steady state 150, the memory system 100 can process the data 110 in the XLC mode 138 and write according to the full capacity of the XLC units 132.

For the burst workload 148, the memory system 100 can process the data 110 in the SLC mode 136, such as using the XLC units 132 to store one bit per cell. The memory system 100 can calculate the session data measure 372 based on counting or tracking the data 110 written in the SLC mode 136 after the preceding idle time event 152. As such, the memory system 100 can use the session data measure 372 to calculate the amount of data written in SLC mode after the idle time event 152, after resetting the session data measure 372, or a combination thereof.

Using identification of the idle time event 152 along with the SLC segment 140 as an indication of the burst workload 148 provides the benefit of increased burst size for appropriate contexts of computing operations. Based on the idle time event 152 and other considerations, the memory system 100 can improve the accuracy in recognizing the workload type 146. The memory system 100 can further manage the subsequent processes based on using the SLC segment 140 instead of the entire allotted cache memory.

As mentioned above, using the entire drive space in SLC mode 136 can reduce the LBA range. For the steady state sequential workloads, the drive can be forced into the garbage collection function 202 for the remaining LBA range not leveraged for the SLC mode 136. Garbage collection function 202 for the underutilized memory can affect the write performance for the steady state sequential workloads. If the SLC cache size is set too low in preventing the problems with underutilization for the steady state sequential workloads, the low threshold can result in underutilization of the SLC cache for the burst workloads 148. The identification of the idle time event 152 and the use of the SLC segment 140 can appropriately distinguish the different workload types 146, allowing the memory system 100 to set the storage mode 134 appropriate for the context. Further, the use of SLC segment 140 provides the benefit of using flexible amounts of SLC cache size that can adapt to both steady state sequential workloads and the burst workloads to provide increased storage density and increase write performance accordingly.

Dynamically adjusting the amount of SLC cache available for the SLC caching function 130 provides improved computing functionality by varying the amount of SLC cache size according to the workload type 146. The memory system 100 can provide larger SLC cache size for typical user workloads, and provide higher write performance. The memory system 100 can further reduce the SLC cache size for typical steady state sequential workloads, increasing processing and storage efficiency accordingly.

Further, using the session data measure 372 to track the data 110 written in the SLC mode 136 after the idle time event 152 provides the benefit of increased burst sizes in typical user workload context. The memory system 100 can use the SLC mode 136 to further improve the write performance for the typical user workload context, while resetting after each idle time can continue or maintain the improved write performance.

Moreover, prioritizing the garbage collection function 202 to target the blocks operating in the SLC mode 136 during the idle time event 152 provides improved computing functionality by freeing up the used block during idle time. Conventionally, to take minimum time to release free block during idle time, blocks with the least valid data are picked for the garbage collection function 202. When the drive is operating at lower amount of valid data, the valid data on the XLC blocks is expected to be less than previously written SLC blocks. Under the conventional approach, the XLC blocks are repeatedly selected for garbage collection and SLC blocks are not targeted for garbage collection function 202; the drive can be stuck operating in XLC mode.

Instead, the memory system 100 can free up large amounts of data written in the SLC mode 136 by targeting the blocks operating in the SLC mode 136 first for the garbage collection function 202. The memory system 100 can free up the blocks operating in the SLC mode 136 first and reuse them appropriately for the burst workload 148.

Dynamically adjusting the size of the SLC memory after each instance of the idle time event 152 provides improved functionality by providing an appropriate amount of the SLC cache memory for each burst. The memory system 100 can increase the SLC by a fixed threshold or dynamically calculate the appropriate amount of SLC memory based on the burst size 154. Since SLC memory is used for SLC caching in subsets (e.g., SLC segments) to prevent unnecessary overuse of the SLC mode 136, increasing the SLC by a fixed threshold can provide the improved write performance for the burst workload 148 without much negative effects for typical user workloads.

The SLC caching operation 130 and/or the method 300 can be executed or implemented, for example, by a processing circuitry for the memory device 102 or the host device 108, such as the controller 106, the memory array 104, processor for the host device 108, a portion therein or a combination thereof. The SLC caching operation 130 can further include, one or more methods, processes, instructions, information, or a combination thereof stored within or accessed using the controller 106, the memory array 104, the host device 108, or a combination thereof.

For illustrative purposes, the flow diagram has been described with a sequence and processes exemplified above. However, it is understood that the method 300 can be different. For example, the operations represented by boxes 304 and 306 or 306 and 308 can be combined into one operation. Also for example, box 350, box 348, or a combination thereof can be part of box 304 instead of box 314.

Figure 4:
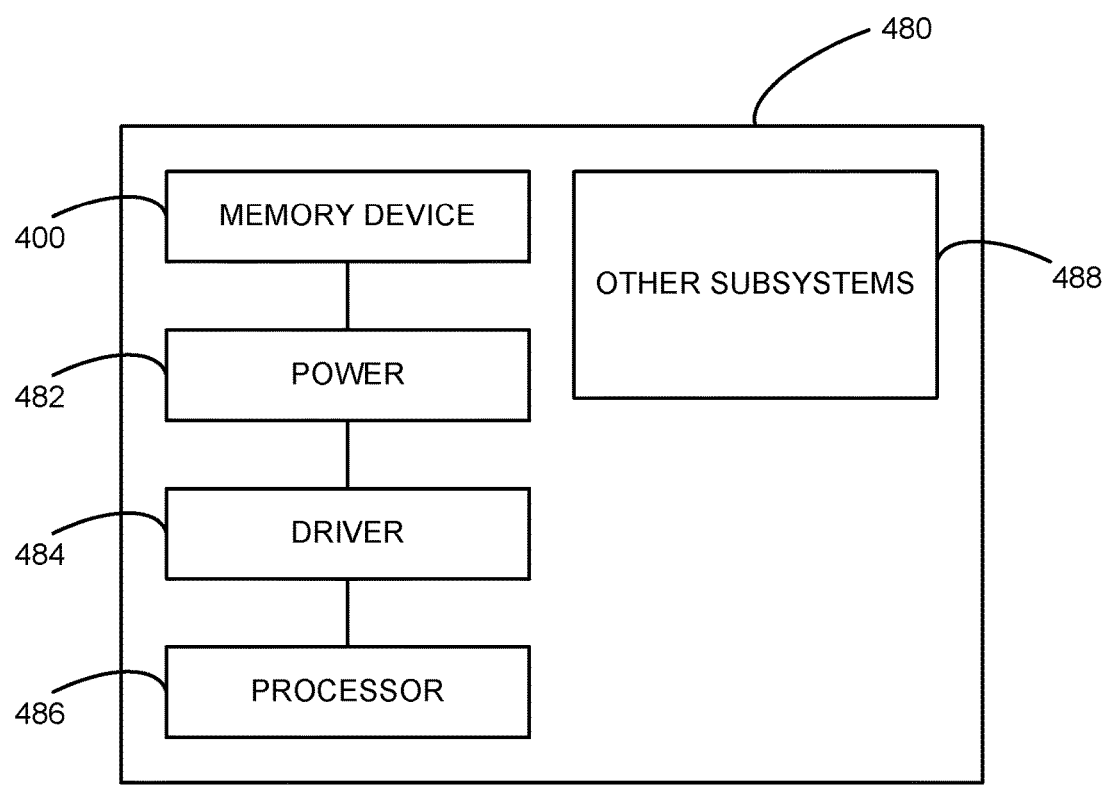
FIG. 4 is a schematic view of a system that includes a memory device in accordance with embodiments of the present technology.

FIG. 4 is a schematic view of a system that includes a memory device in accordance with embodiments of the present technology. Any one of the foregoing memory devices described above with reference to FIGS. 1-3 can be incorporated into any of a myriad of larger and/or more complex systems, a representative example of which is system 480 shown schematically in FIG. 4. The system 480 can include a memory device 400, a power source 482, a driver 484, a processor 486, and/or other subsystems or components 488. The memory device 400 can include features generally similar to those of the memory device described above with reference to FIGS. 1-3, and can therefore include various features for performing the processes discussed above. The resulting system 480 can perform any of a wide variety of functions, such as memory storage, data processing, and/or other suitable functions. Accordingly, representative systems 480 can include, without limitation, hand-held devices (e.g., mobile phones, tablets, digital readers, and digital audio players), computers, vehicles, appliances and other products. Components of the system 480 may be housed in a single unit or distributed over multiple, interconnected units (e.g., through a communications network). The components of the system 480 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

We claim:

1. A memory device, comprising:
a memory array including a plurality of memory cells, the plurality of memory cells including a plurality of cache memory cells; and
a controller coupled to the memory array, the controller configured to:
track usage of a first subset of the plurality of cache memory cells operating in a single-level cell (SLC) mode, wherein the tracking includes monitoring for an idle time event; and
designate a storage mode for a second subset of the plurality of cache memory cells based on the tracked usage of the first subset, wherein:
the storage mode is designated according to an amount of data written to the first subset before the idle time event, and
the storage mode determines a storage density to be used for data writes.

2. The memory device of claim 1 wherein the controller is further configured to implement a garbage collection function for memory cells of the plurality of cache memory cells operating in SLC mode before memory cells of the plurality of cache memory cells not operating in SLC mode.

3. The memory device of claim 1 wherein the controller is further configured to dynamically calculate an SLC increment size for controlling a size or capacity of the second subset.

4. The memory device of claim 1 wherein the controller is further configured to determine a workload type based on the tracked usage of the first subset, wherein the workload type is for characterizing work being performed by the memory device.

5. The memory device of claim 4 wherein the controller is further configured to:
determine the workload type to be a burst workload type based on a detection of the idle time event before the first subset is fully written.

6. The memory device of claim 5 wherein the controller is further configured to:
initialize a session data measure based on detecting the idle time event;
calculate the session data measure based on tracking an amount of data written after the idle time event is detected; and
designate the storage mode for the second subset to be the SLC mode when the session data measure is less than an SLC maximum threshold, an increment limit, or a combination thereof.

7. The memory device of claim 5 wherein the controller is further configured to implement a garbage collection function during the idle time event, wherein the garbage collection function operates on memory cells of the plurality of cache memory cells operating in SLC mode before memory cells of the plurality of cache memory cells not operating in SLC mode.

8. The memory device of claim 5 wherein the controller is further configured to dynamically calculate an SLC increment size during or after the idle time event, wherein the SLC increment size is for controlling a size or capacity of the second subset.

9. The memory device of claim 5 wherein the controller is configured to designate the storage mode for the second subset to be the SLC mode based on determining the workload type to be the burst workload.

10. The memory device of claim 9 wherein the controller is further configured to:
calculate an SLC increment size during or after the idle time event, wherein the SLC increment size is for controlling a size or capacity of the second subset; and
dynamically determine addresses of the second subset according to the SLC increment size,
wherein the second subset is determined based on designating a number of the memory cells according to the SLC increment size.

11. The memory device of claim 9 wherein the controller is further configured to dynamically determine the addresses of the second subset according to a predetermined SLC increment size for the subsequent or upcoming data writes.

12. The memory device of claim 1 wherein the controller is further configured to determine a steady state workload when the first subset becomes full before identification of the idle time event.

13. The memory device of claim 1 wherein the controller is further configured to designate an extra level cell (XLC) mode for the storage mode of the second subset when the first subset becomes full before identification of the idle time event.

14. The memory device of claim 1 wherein the memory cells are non-volatile.

15. A method of operating a memory system including a controller and a memory array including a plurality of memory cells with a plurality of cache memory cells, the method comprising:
storing data into a first subset of the plurality of cache memory cells operating in a single-level cell (SLC) mode;
detecting an idle time event for describing a pause in storing the data;
calculating a session data measure for representing an amount of data stored in the first subset with respect to the idle time event; and
designating, with the controller, an SLC mode for a second subset of the plurality of cache memory cells based on the session data measure,
wherein the SLC mode is for designating the memory cells to each store one bit for subsequent or upcoming data writes.

16. The method of claim 15, further comprising:
resetting the session data measure based on identifying the idle time event;
wherein:
calculating the session data measure includes calculating an amount of the data written in the SLC mode after the idle time event; and
designating the SLC mode includes designating the SLC mode when the session data measure is less than an SLC maximum threshold, an increment limit, or a combination thereof,
wherein the SLC mode is for controlling a storage mode of the memory cells storing the data after the idle time event.

17. A method of operating a memory system including a controller and a memory array including a plurality of memory cells with a plurality of cache memory cells, the method comprising:
tracking usage of a first subset of the plurality of cache memory cells operating in a single-level cell (SLC) mode, wherein the tracking includes monitoring for an idle time event; and
designating, with the controller, a storage mode for a second subset of the plurality of cache memory cells based on the tracked usage of the first subset, wherein the storage mode determines a storage density to be used for data writes;
identifying the idle time event for describing a pause in processing data;
calculating a session data measure representing an amount of the data written to the first subset after the idle time event; and
wherein:
designating the storage mode includes designating the SLC mode for the storage mode when the session data measure is less than an SLC maximum threshold, an increment limit, or a combination thereof.

18. The method of claim 17, wherein the storage mode for the second subset includes designating a number of extra-level cell (XLC) units to operate in the SLC mode for storing one bit per each of the XLC units, wherein the XLC units are each capable of storing more than one bit.

19. The method of claim 18, further comprising:
writing data to the first subset;
identifying the idle time event for describing a pause in writing the data;
dynamically determining addresses for the second subset after or during the idle time event; and
wherein:
designating the storage mode includes designating the SLC mode for configuring the memory cells of the second subset to each store one bit for the subsequent or upcoming data writes.

20. The method of claim 19, wherein dynamically determining the addresses for the second subset includes designating a number of the XLC units corresponding to a SLC increment size that is predetermined before the idle time event or dynamically calculated based on a burst size.

21. The method of claim 17, further comprising:
storing data into the first subset including XLC units operating in the SLC mode;
identifying the idle time event for describing a pause in processing the data;
implementing a garbage collection function during the idle time event first for the XLC units operating in the SLC mode,
wherein the garbage collection includes freeing up the memory cells previously used to store the data for subsequent or upcoming data writes.

* * * * *